Patented Nov. 1, 1949

2,486,665

UNITED STATES PATENT OFFICE 2,486,665

COATING COMPOSITION COMPRISING AN ALKYD RESIN AND AN ALKOXY METHYLOLMELAMINE

Paul E. Marling, Dayton, Ohio, assignor to Monsanto Chemical Company, St. Louis, Mo., a corporation of Delaware No Drawing. Application March 29, 1946, Serial No. 658,223

6 Claims. (Cl. 260—22)

This invention relates to an alkyd resin coating composition.

An object of this invention is to provide a protective coating composition comprising an alkyd resin, and an alkoxy methylolmelamine condensation product which will remain clear and compatible upon drying.

Alkoxy methylolmelamine condensation products are desirable components of alkyd resin coating compositions such as baking enamels, because of the hardness and abrasion-resistance imparted to the coating compositions by said melamine condensation products. Coating compositions containing such resins and condensation products, when formulated with more than 15% by weight of alkoxy methylolmelamine (said percentage being based upon the total weight of modified drying oil alkyd resin solids plus melamine condensation product), develop an opaque to cloudy film with reduced gloss when baked to hardness. This is very objectionable. The present resins are employed in baking enamel compositions used for refrigerators and automobile finishes where hardness, gloss and abrasion-resistance are very much desired.

I have discovered that if, in the alkyd resin process, the esterification of the alcoholized drying or semi-drying oil with a polycarboxylic acid be carried out in the presence of anthraquinone, that the resulting fatty acid glycerol ester may thereafter be cold blended with an alkoxy methylolmelamine condensation product and a permanently clear, hard coating composition obtained having a high gloss.

The alcoholysis of the fatty oil-glycerol mixture may be carried out either by means of heat alone or by heat with the aid of basic catalysts such as lime, as is described in U. S. 2,123,206. Drying or semi-drying oils such as soya, tung, oiticica, sunflower seed, cottonseed, dehydrated castor oil, cocoanut oil, etc. either alone or in mixtures may be employed. Glycerol or other polyhydric alcohol is mixed therewith and heated for a period of time so that mono- and diglycerides or other alcoholysis products are formed in sufficient quantity in order to dissolve the subsequently added dibasic acid. If lime is employed as an alcoholysis catalyst, it is desirable to add to the alcoholized product a small amount of orthophosphoric acid, as described in my copending application, Serial No. 642,135, filed January 18, 1946, now Patent 2,479,951, in order to prevent the formation of a cloudy precipitate caused by the presence of lime.

Upon completion of the alcoholysis step, the required amount of polybasic acid, such as phthalic anhydride is added in order to esterify the alcoholized oil and at or about the same time a small amount of anthraquinone is added. The esterification is now carried to completion by means of heat in the presence of said anthraquinone. Esterification is carried to the point where the acid number is sufficiently low to produce a desirable resin. Generally the esterification will be carried to the point where the acid number is below 10 or 15.

When esterification is complete, as indicated by the resin having a sufficiently low acid number, a solvent or thinner is added and then the resin is cold-blended with the desired amount of an alkoxy methylolmelamine condensation product. Additional solvents, pigments and driers, if desired, may be added and the material then used as a baking enamel or for other purposes.

The alkoxy methylolmelamine condensation products employed in my composition may be prepared according to the disclosure of U. S. 2,197,357. The preparation is first carried out by preparing methylolmelamine and then etherifying the product by treatment with any lower aliphatic alcohol containing from 1 to 5 carbon atoms, such, for example, as methanol, ethanol, propanol, butanol or amylol in the presence of an acid condensing agent. The preparation of methylolmelamine may be carried out as described in U. S. 2,387,547. Any number of methylol groups up to six may be introduced by treatment with formaldehyde, the number of methylol groups introduced being dependent upon the amount of formaldehyde employed. I prefer to so proportion the reactants so as to introduce four or five methylol groups per melamine molecule. The methylol groups so introduced may be wholly or partly etherified by means of any aliphatic alcohol. When the tetra- or pentamethylolmelamine has been prepared, I prefer to produce the dibutyl or tributyl ether (or mixtures thereof) for use in the present invention.

The preparation of the preferred butyl ethers is carried out as follows:

Crystalline tetramethylolmelamine is prepared by reacting four mols of formaldehyde (37% solution) with one mol of melamine at a pH of 9.5. The melamine-formaldehyde mixture and a suitable alkaline buffer to give the above pH are heated to 80° C., at which point a clear solution forms. This solution is then cooled slowly to crystallize the tetramethylolmelamine which is then separated by filtration. The crystal mass so recovered is washed with alcohol and dried by suction or by other means to a volatile content of 30% or less. This intermediate compound is stable and may be stored indefinitely. It is soluble only in acid solution or in hot water. In making the butyl ether, 100 parts by weight of tetramethylolmelamine containing approximately 30% volatiles is suspended in 200 parts by weight of n-butanol. This mixture is well agitated and heated to 45° C. At this point 10 parts of 85% phosphoric acid is added and the reaction continued at 50° C. for about one hour. A clear solution forms after about 30 minutes of heating. After this reaction, the acid is neutralized with sodium hydroxide and the pH adjusted to the phenolphthalein alkaline end point. The neutralized solution of the butyl ether in butanol is cooled and filtered to remove the inorganic salt. After removal of the salt, the solution is concentrated to the desired solids content, usually about 60% solids. The product is, at this stage, completely soluble in a mixture of butanol and toluene.

Other mineral acids may be used for the etherification reaction and the ratio of alcohol to the methylolmelamine may be varied when it is desired to produce any of the other ethers.

The alkoxy methylolmelamine condensation product is cold-blended with the alkyd resin, while the former is dissolved in a solvent, preferably butanol or a mixture of butanol and xylene.

The proportions in which the alkoxy methylolmelamine condensation product is combined with the alkyd resin will generally vary from a minimum of 15% of the melamine condensation product and 85% of the alkyd resin up to 50% of the melamine condensation product and 50% of the alkyd resin, all percentages being based on resin solids and condensation product solids. The final coating composition will, of course, contain various solvents or thinners, pigments or driers, as may be necessary or desirable for the specific purpose in view.

The invention is further illustrated, but not limited, by the following examples:

EXAMPLE 1

150 parts by weight of soy bean oil and 81 parts by weight of glycerine were heated, with stirring, to 530° F. to 540° F. for 50 to 60 minutes for alcoholysis, while continually introducing carbon dioxide gas. The completion of alcoholysis to mono- and diglycerides in sufficient quantity to dissolve phthalic anhydride was measured by the solubility to a clear liquid of one part (by vol.) oil-glycerine product in four parts (by vol.) of methyl alcohol. After cooling the alcoholysis product to 400° F., 150 parts by weight of phthalic anhydride were added, then the temperature was raised to 450° F. and held at 450° F. to 460° F. for 1¾ hours. The acid value of the finished product was 12.0. The finished resin was cooled and then thinned to 60% solids with xylol. The color of the resin solution was 5 (Gardner) and the viscosity was Z (Gardner-Holt).

This product was cold-blended with a butoxy methylolmelamine condensation product in varying proportions. The blends were spread in thin films on glass and heated for ½ hour at 300 F. The results of the tests are given in Table A.

EXAMPLE 2

150 parts by weight of soy bean oil and 81 parts by weight of glycerine were heated at 530° F. to 540° F. for 50 minutes for alcoholysis, then tested for solubility in methyl alcohol, as described in Example 1. After cooling to 400° F., 150 parts by weight of phthalic anhydride and 0.8 part by weight of anthraquinone were added, then the temperature was raised to 450° F. and held at 450° F. to 460° F. for two hours. The acid value of the product was 1.2. The finished resin was thinned to 40% solids with xylol. The color of the resin solution was 5 (Gardner) and the viscosity was Z (Gardner-Holt). The anthraquinone was 0.53 per cent by weight of the oil. The product was cold-blended with melamine-formaldehyde type polymers in various proportions. The films were tested as described in Example 1. The results of the tests are also given in Table A.

Table A

| | Parts of Alkyd Resin-Solids—Weight | Parts of Melamine Resin-Solids—Weight | Condition of Film Baked ½ Hr.—300° F. |
|---|---|---|---|
| | Per Cent | Per Cent | |
| Example 1 | 85 | 15 | Clear film. |
| | 75 | 25 | Cloudy film. |
| | 65 | 35 | Opaque film. |
| | 55 | 45 | Do. |
| | 50 | 50 | Do. |
| Example 2 | 85 | 15 | Clear film. |
| | 75 | 25 | Do. |
| | 65 | 35 | Do. |
| | 55 | 45 | Do. |
| | 50 | 50 | Do. |

EXAMPLE 3

The same ingredients, processing procedure and temperature were employed as in Example 1, except that samples were taken from the alkyd resin processing batch at intervals of ½, 1, 1½, 1¾ and 2 hours, after reaching a temperature of 450° F. to 460° F. These samples were thinned to 60% solids with xylol and cold-blended with melamine-formaldehyde polymer at room temperature, then the films were cured on glass at 300° F. for ½ hour. The results obtained in this example are given in Table B.

Table B

| Processed, Hrs. | Parts of Alkyd Resin-Solids—Weight | Parts of Melamine Resin-Solid—Weight | Condition of Film Baked ½ Hr.—300° F. |
|---|---|---|---|
| | Per cent | Per cent | |
| ½ | 50 | 50 | Clear film. |
| 1 | 50 | 50 | Do. |
| | 75 | 25 | Do. |
| 1½ | 65 | 35 | Cloudy film. |
| | 55 | 45 | Opaque film. |
| | 50 | 50 | Do. |
| | 85 | 15 | Clear film. |
| | 75 | 25 | Cloudy film. |
| 1¾ | 65 | 35 | Opaque film. |
| | 55 | 45 | Do. |
| | 50 | 50 | Do. |
| | 85 | 15 | Clear film. |
| | 75 | 25 | Cloudy film. |
| 2 | 65 | 35 | Opaque film. |
| | 55 | 45 | Do. |
| | 50 | 50 | Do. |

The results of Table B indicate that in the absence of anthraquinone the opaque condition of the alkyd resin-melamine blend became worse as the time of processing was increased.

The alkyd resins formed upon ½ and one hour processing gave a clear film after baking for ½ hour at 300° F. in the 50–50 alkyd resin-melamine blend. However, the alkyd resin itself at these points (see Table C below) had a very high acid value, very low viscosity and poor drying properties. Such films are not esterified sufficiently for practical use either alone or in melamine blends. The alkyd resin, formed upon 1½ hours' processing gave a clear film when baked, as described in a 75–25 alkyd resin-melamine blend. However, beyond 35% melamine condensation product the cured films were cloudy to opaque. This alkyd resin film (Table C) had an unsatisfactory acid value, unsatisfactory viscosity and only fair drying properties. The alkyd resin formed upon 1¾ and two hours' processing gave a clear film when baked at 300° F. in the 85–15 alkyd resin-melamine blend. However, beyond 15% melamine condensation product the cured films were cloudy to opaque. The alkyd resin itself at 1¾ hours' processing time was satisfactory in acid, viscosity and drying for vehicle use alone. However, in the absence of anthraquinone some products are produced during processing which result in an alkyd resin which is not compatible when baked in films containing more than 15% melamine condensation product.

Table C

| Processed, Hrs. | Acid Value | Viscosity (Gardner) 60% Resin in Xylene | Drying Properties |
|---|---|---|---|
| ½ | 40 | C | Slow. |
| 1 | 30 | F | Do. |
| 1½ | 20 | K | Fair. |
| 1¾ | 12 | Z | Satisfactory. |
| 2 | | Part gel | Satisfactory but rough. |

The esterification of alcoholized fatty glycerides with phthalic anhydride is a progressive reaction, the acidity decreasing and the viscosity increasing progressively with time. The results given in Table C above are illustrative of this effect and were obtained by heating soy bean oil and glycerine to completion of alcoholysis, after which phthalic anhydride was added, the procedure being substantially as described in Example 1. After reaching a temperature of 450° F., small samples were taken from the esterification mixture after ½, 1, 1½, 1¾ and 2 hours' processing time. These samples were then tested for acid value, viscosity in xylene and 60% solution of resin and the air drying properties (cobalt drier) determined. The acid value of the sample processed for two hours could not be determined because the resin had gelled and had become insoluble in xylene.

The results in Example 2 indicate that the presence of anthraquinone prevents the formation of the undesirable products formed in Example 1 that produce opaque films of blends with melamine.

EXAMPLE 4

The same ingredients and processing temperature were used as in Example 2, except that 0.2 part by weight of anthraquinone was used (0.13% of the oil by weight). The product was processed two hours and 20 minutes at 450° F. to 460° F. The acid value was 1.1. The product was thinned to 60% solids with xylene. The alkyd resin solution had a color of 5 (Gardner) and viscosity Z–1 to Z–2 (Gardner-Holt).

This product was cold-blended with butoxy methylolmelamine condensation product in proportions of 15%, 25%, 35%, 45% and 50% melamine product solids and cured on glass in thin films at ¼, ½ and 1 hour at 250° F., 275° F., 300° F. and 325° F. The cured films were all clear.

EXAMPLE 5

The same ingredients, processing temperature and time were used as in Example 1. The finished product had substantially the same acid value, color and viscosity. This product was cold-blended with a butoxy methylolmelamine condensation product in proportions of 15%, 25%, 35%, 45% and 50% melamine product solids and cured on glass in thin films at ¼, ½ and 1 hour at 250° F., 275° F., 300° F. and 325° F. The cured films containing more than 15% solids were cloudy to opaque. The cured films containing 15% melamine were clear. The butoxy methylolmelamine condensation product contained 50% solids, 25% butanol and 25% xylol.

Tests indicate that hydroquinone addition does not improve the alkyd resin compatibility with melamine in cured films.

It will, of course, be appreciated that other alkyd resin-forming ingredients may be employed other than those specifically disclosed in the above examples. Moreover, the ingredients may be varied in proportion as is understood by those skilled in this art. Examples of other polyhydric alcohols are pentaerythritol, ethylene glycol, polyethylene glycol, mannitol, or mixtures thereof, or with glycerine. Examples of polybasic acids other than phthalic acid are maleic, succinic, tartaric and fumaric acids or anhydrides. Mixtures of these acids or anhydrides may also be employed. The amount of anthraquinone employed is not critical and will, in general, vary from 0.1% to 0.5% by weight based on the oil.

As may be apparent to those skilled in the art, the use of an inert atmosphere during the processing is not essential, since modified alkyd resins of fair color are obtainable when the reaction mixture is exposed to air. However, the products obtained when working in air are not of as good a color as when using an inert atmosphere such as is supplied by nitrogen, carbon dioxide, etc. Hence, I prefer to produce the resin in the absence of atmospheric oxygen by causing the reaction to take place when protected by an inert atmosphere, for example, as by bubbling a rapid stream of carbon dioxide or nitrogen gas through the reaction mixture. Also, as will be understood by those skilled in the art, the ratio of polyhydric alcohol and polybasic acid may be varied within certain limits. Reaction temperatures may be varied generally from 440° F. up to 560° F. Reaction conditions will also vary somewhat with the type of drying or semi-drying oil or mixtures thereof which may be employed.

As many apparently widely different embodiments of this invention may be made without departing from the spirit and scope thereof, it is to be understood that the present invention is limited only by the appended claims.

What I claim is:

1. The process of producing a coating composition which comprises forming an alkyd resin by heating in the presence of anthraquinone a mixture of mono- and diglycerides of drying oil acids with an organic polybasic carboxylic acid to form an alkyd resin and then blending the said alkyd resin with an alkyd ether of methylolmelamine soluble in butanol, said blending being carried out in the proportions, based on solids content of from 15% to 50% of said alkyl ether of methylolmelamine to from 85% to 50% of said alkyd resin.

2. The process of producing a coating composition which comprises forming an alkyd resin by heating in the presence of anthraquinone, a mixture of mono- and diglycerides of drying oil acids with an organic polybasic carboxylic acid to form an alkyd resin and then mixing said alkyd resin with an alkyl ether of methylolmelamine containing no alkyl group of more than five carbon atoms and soluble in butanol, said mixing being carried out in the proportions, based on solids content, of from 15% to 50% of said alkyl ether of methylolmelamine to from 85% to 50% of said alkyd resin.

3. The process of producing a coating composition which comprises forming an alkyd resin by heating, in the presence of anthraquinone, a mixture of mono- and diglycerides of acids of fatty oils having drying properties with phthalic anhydride to form an alkyd resin and then mixing said alkyd resin with a butyl ether of methylolmelamine soluble in butanol, said mixing being carried out in the proportions, based on solids content, of from 15% to 50% of said butyl ether of methylolmelamine to from 85% to 50% of said alkyd resin.

4. The process of producing a coating composition which comprises forming an alkyd resin by heating, in the presence of anthraquinone, a mixture of mono- and diglycerides of soy bean oil acids with phthalic anhydride to form an alkyd resin and then mixing said alkyd resin with a butyl ether of methylolmelamine condensation product soluble in butanol, said mixing being carried out in the proportions, based on solids content, of from 15% to 50% of said butyl ether of methylolmelamine product to from 85% to 50% of said alkyd resin.

5. The process of producing a coating composition which comprises forming an alkyd resin by heating with phthalic anhydride, in the presence of anthraquinone, a mixture of mono- and diglycerides formed by the alcoholysis of soy bean oil with glycerine, the amount of anthraquinone being from 0.1% to 0.5% by weight, based on said oil, said heating being continued until said alkyd resin has an acid number below 10, and then cold-blending said alkyd resin with a butyl ether of methylolmelamine soluble in butanol, said blending being carried out in the proportion of from 15% to 50% of said butyl ether of methylolmelamine to from 85% to 50% of said alkyd resin.

6. The process of producing a coating composition which comprises forming an alkyd resin by heating with phthalic anhydride, in the presence of anthraquinone, a mixture of mono- and diglycerides formed by the alcoholysis of soy bean oil with glycerine, the amount of anthraquinone being from 0.1% to 0.5% by weight, based on said oil, said heating being continued until said alkyd resin has an acid number below 15, adding a thinner thereto, and then cold-blending said alkyd resin with a butyl ether of methylolmelamine condensation product soluble in butanol, said blending being carried out in the proportions of from 15% to 50% of said butyl ether of methylolmelamine condensation product to from 85% to 50% of said alkyd resin.

PAUL E. MARLING.

REFERENCES CITED

The following references are of record in the file of this patent:

UNITED STATES PATENTS

| Number | Name | Date |
|---|---|---|
| 2,125,484 | Bogin | Aug. 2, 1938 |
| 2,218,474 | Moore | Oct. 15, 1940 |
| 2,426,379 | Swain et al. | Aug. 26, 1947 |